(No.Model.)

W. J. WEBB.
FEED TROUGH.

No. 459,322.      Patented Sept. 8, 1891.

Witnesses
H. S. Dieterich
H. J. Riley

Inventor
William J. Webb.
By his Attorneys,
C. A. Snow & Co.

THE NORRIS PETERS CO., PHOTO-LITHO., WASHINGTON, D. C.

UNITED STATES PATENT OFFICE.

WILLIAM JAMES WEBB, OF SABINE PASS, TEXAS.

FEED-TROUGH.

SPECIFICATION forming part of Letters Patent No. 459,322, dated September 8, 1891.

Application filed October 21, 1890. Serial No. 368,828. (No model.)

*To all whom it may concern:*

Be it known that I, WILLIAM JAMES WEBB, a citizen of the United States, residing at Sabine Pass, in the county of Jefferson and State of Texas, have invented a new and useful Feed-Trough, of which the following is a specification.

This invention relates to improvements in feed-troughs.

The object of the present invention is to provide a feed-trough in which a quantity of feed can be placed, and in which the latter will be fed as rapidly as consumed, and in which the unconsumed feed will be protected.

The invention consists in the construction and novel combination and arrangement of parts hereinafter fully described, illustrated in the accompanying drawings, and pointed out in the claims hereto appended.

Figure 1:
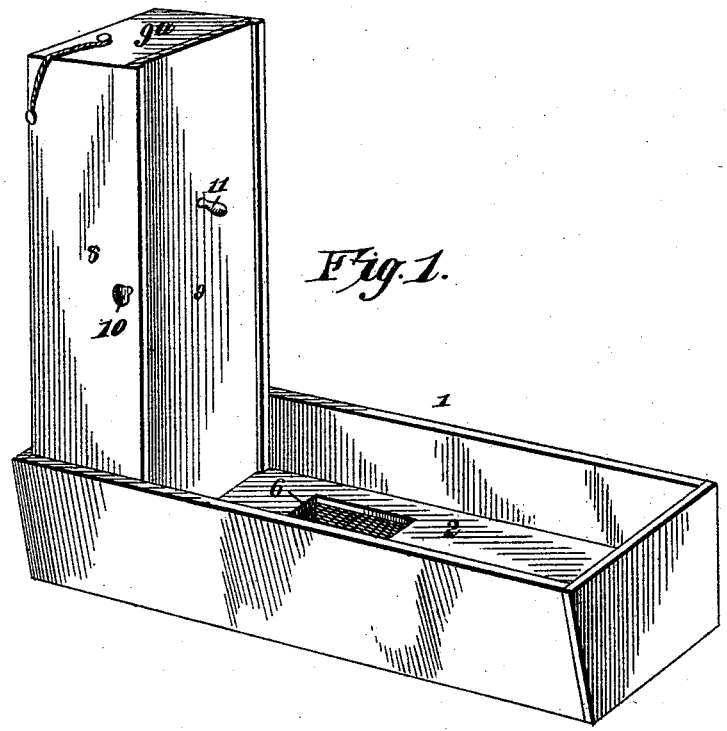
Figure 2:
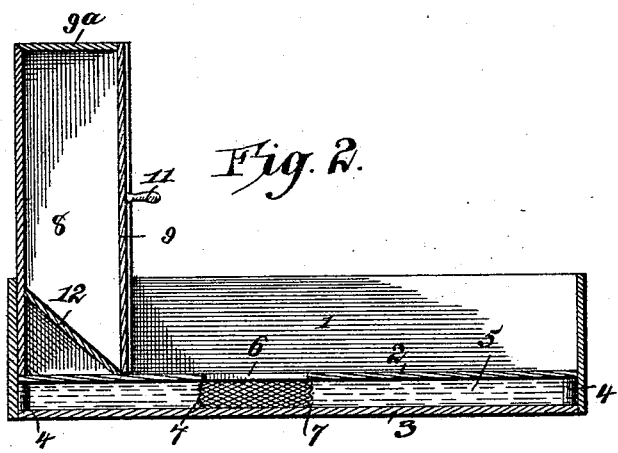
Figure 3:
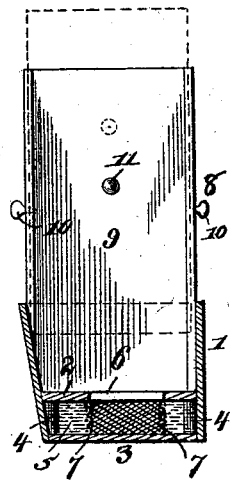

In the drawings, Figure 1 is a perspective view of a feed-box constructed in accordance with this invention. Fig. 2 is a central longitudinal sectional view. Fig. 3 is a transverse sectional view.

Referring to the accompanying drawings, 1 designates a feed-trough, preferably rectangular in construction and provided with a false bottom 2, arranged above the bottom 3 of the trough and supported on blocks 4 or the like to provide a space 5, adapted to contain water for the purpose of moistening feed. The false bottom 2 is provided with an opening 6, which forms a cavity into which feed falls to be moistened, and to prevent feed entering the space 5 between the false bottom and the bottom 3 wire-gauze or foraminous walls 7 are provided around the cavity.

Arranged at one end of the trough 1 a short distance from the opening in the false bottom is a vertical feed-box 8, having its side adjacent to the cavity of the feed-trough provided with sliding door 9, which is adapted to be slightly raised to permit the feed to fall from the vertical feed-box into the trough, and the said door may be adjusted vertically to limit the size of the feed-opening, and it is maintained in its vertical adjustment by a set-screw 10, arranged in one side of the feed-box and adapted to engage the sliding door, which is provided with a knob 11 to facilitate raising.

The vertical feed-box is provided with an inclined bottom 12, which forms a chute to direct the feed into the trough, and when the sliding door is raised to provide a discharge-opening feed will accumulate between the feed-box and the moistening-cavity and will itself prevent a further discharge; but as soon as it is eaten feed will be resupplied, and the operation will be continued as long as the feed is being eaten by cattle. The feed to be eaten by the cattle will be moistened in the cavity formed by the opening in the false bottom, find it will be seen that the feed is protected and is kept under cover with the exception of a small amount in the feed trough and cavity.

The feed-box 8 is provided with a removable top $9^a$, by which the box can be filled from time to time.

From the foregoing description and the accompanying drawings, the construction, operation, and advantages of the invention will be readily understood.

Having thus described my invention, what I claim is—

1. The combination of the trough having a false bottom forming a water-chamber and provided with an opening, and the vertically-disposed feed-box arranged adjacent the opening of the false bottom and having a sliding door and means for securing the same in its vertical adjustment, and provided with the inclined bottom forming a chute to direct feed into the trough and opening of the false bottom, substantially as described.

2. The combination of the feed-trough having a false bottom provided with the opening forming a moistening-cavity and having foraminous walls for the same, the feed-box arranged adjacent to the moistening-cavity and having a vertically-sliding door, and provided with an inclined bottom forming a chute, and set-screw arranged to engage the sliding door, substantially as and for the purpose described.

In testimony that I claim the foregoing as my own I have hereto affixed my signature in presence of two witnesses.

WILLIAM JAMES WEBB.

Witnesses:
H. G. LUND,
D. P. WHEAT.